United States Patent [19]

Ishida et al.

[11] Patent Number: 4,646,916

[45] Date of Patent: Mar. 3, 1987

[54] MOLDED MAGNETIC TAPE CASSETTE CASE HAVING IMPROVED GATE MARK LOCATION

[75] Inventors: Toshihiko Ishida, Komoro; Eiichi Nunokawa, Saku, both of Japan

[73] Assignee: TDK Corporation, Japan

[21] Appl. No.: 781,678

[22] Filed: Sep. 30, 1985

[30] Foreign Application Priority Data

Nov. 8, 1984 [JP]  Japan ............................ 59-168555[U]

[51] Int. Cl.⁴ ........................................... B65D 85/672
[52] U.S. Cl. .................................. 206/387; 206/444; 264/328.12; 264/328.9
[58] Field of Search ............................ 206/387, 444; 264/328.9, 328.12

[56] References Cited

U.S. PATENT DOCUMENTS

| | | | |
|---|---|---|---|
| 3,620,361 | 11/1971 | Fugiwara | 206/387 |
| 4,162,047 | 7/1979 | Hashimoto | 264/328.12 |
| 4,431,237 | 2/1984 | Saito et al. | 206/387 |
| 4,438,860 | 3/1984 | Okamura et al. | 264/328.12 |
| 4,527,690 | 7/1985 | Schmidts et al. | 206/45.15 |

FOREIGN PATENT DOCUMENTS 207074  11/1984  Japan ............................ 264/328.12

OTHER PUBLICATIONS

Injection Molding: Theory and Practice, by Irvin Rubin, 6/1973, pp. 124-126.

Primary Examiner—William Price
Assistant Examiner—Brenda J. Ehrhardt
Attorney, Agent, or Firm—Wood, Dalton, Phillips, Mason & Rowe

[57] ABSTRACT

In a case for holding a magnetic tape cassette comprising a lid and an inner enclosure formed of a planar bottom wall portion having a pair of spool stops projecting inwardly from its inner side and edge walls formed along the periphery of the bottom portion excepting a part of it and extending perpendicularly to that portion, one of the edge walls being formed with a thumb recess, the inner enclosure is made by a mold with a gate inlet so that the bottom portion has a gate mark on its outer side at a point where that portion meets the edge wall formed with the thumb recess, at a right angle to it, and underneath the recess. The planar bottom portion and peripheral edge walls are molded together in one piece. The gate mark is located at the point on an extension of a line intersecting the midpoint of a straight line that connects the two spool stops, on the outer side of the planar bottom portion, and extending at right angles to the straight line.

2 Claims, 6 Drawing Figures

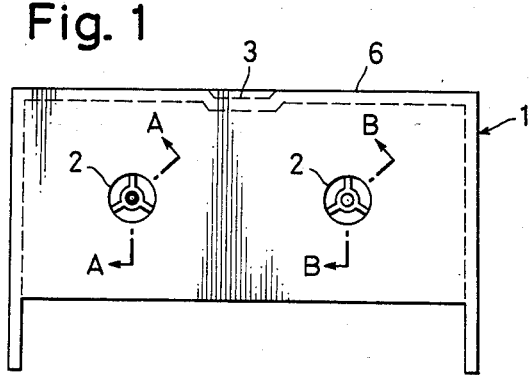
Fig. 1
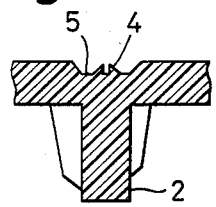
Fig. 2A-A
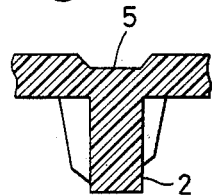
Fig. 2B-B
Fig. 3 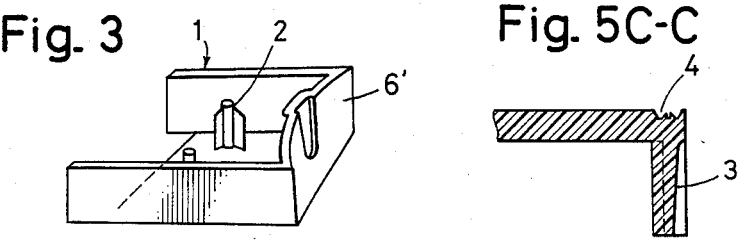 Fig. 5C-C 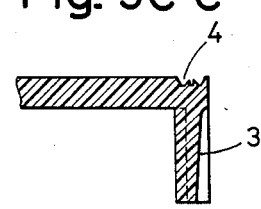
Fig. 4
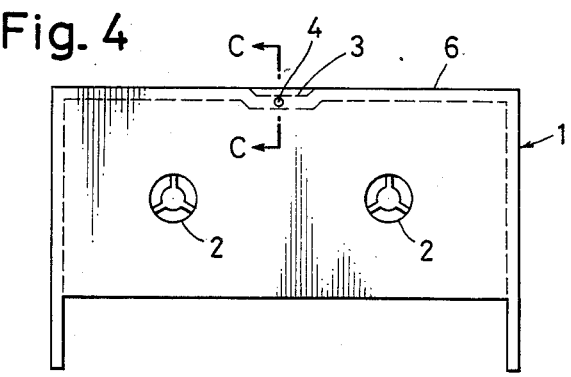

MOLDED MAGNETIC TAPE CASSETTE CASE HAVING IMPROVED GATE MARK LOCATION

BACKGROUND OF THE INVENTION

This invention relates to a case for holding a magnetic tape cassette.

Conventional cases for magnetic tape cassettes are made of plastics by molding. A flat planar wall portion constituting part of the inner enclosure of each case has a pair of spool stops formed on the inner side at locations where they are mated to the spool apertures of the cassette contained in the case. One of peripheral edge walls, extending longitudinally of, and perpendicularly to, the inner side of the planar portion where the spool stops protrude, includes a thumb recess formed on its outer side to facilitate the opening and closing of the lid of the case.

For the manufacture of the magnetic tape cassette case, a mold is used which usually has a gate inlet for the molding resin at a location exactly corresponding to the center of one of the spool stops, on the side of the planar wall portion not provided with the stops, or the side that forms the outside of the molded case. Alternatively, two such inlets are provided at locations opposite to the centers of the both spool stops, instead of either one.

The back side of the planar wall portion is ordinarily formed with dents at points corresponding to the centers of the spool stops to allow for shrinkage on molding. Common practice makes use of such a dent in providing an inlet when a direct gate is used. In practice, however, the centers of the spool stops have such great wall thickness that proper timing for gate sealing is difficult to achieve, especially with a direct gate. If the gate sealing is premature a short shot, or inadequate packing of the mold cavity, results and no dwell is provided during the cooling for hardening of the molded object. As a result, after-shrinkage develops in the center of the thick-walled spool stop, causing shrinkage at the former location of the gate inlet. Conversely if the sealing is delayed, adequate gate seal is not obtained and a phenomenon called "driveling" in professional jargon, in which the molten resin partly runs down the inlet as the mold is opened, takes place.

The gate inlet provided at the root of the spool stop center is rather distant from the peripheral edge wall where the tumb recess for opening and closing the case is formed. In the molding operation, therefore, the molten resin injected through the gate inlet into the mold cavity portion constituting the thumb-recessed edge wall tends to be cooled to harden there before filling up the rest of the mold cavity. Like premature gate sealing, this makes it impossible to provide adequate dwell of the incoming resin in the edge wall portion of the cavity. The result is frequent warpage or other deformation of the longitudinal edge wall of the molded case. Such a change in shape of the edge wall presents a wrapping problem for the molded product. The cassette case usually is wrapped with a piece of film sealed at edges on the peripheral walls of the case. Any warpage or distortion of the longitudinal edge wall would then force the sealed edges of the wrapping film out of contact with that case wall. When this occurs, the joined film edges can be easily separated or peeled apart by external forces. Needless to say, partial exposure of the product, with the wrap edges thus forced apart, lessens its marketable value seriously.

Generally, in the process of injection molding, packing strain is produced around the gate inlet due to overpacking as a consequence of the cooling and shrinkage of the charge in the mold. Also, residual strain results from uneven cooling and shrinkage of the thick-walled spool stops. These strains combine to reduce the impact resistance of the limited case regions around the spool stops.

The gate inlet is heated by the hot resin passing through it and also by the heat generated by the resin as it is squeezed through the constriction of the gate. The hot inlet, in turn, heats the mold. At the same time, the heat produced by the resin introduced into the cavity depressions to form the thick-walled spool stops likewise supplies heat to the mold. These heats synergetically boost the mold temperature to a substantial degree. As is commonly known in the art, mold temperature exerts material influences upon the moldings. For instance, it influences the pressure loss on resin injection, crystal structure of a hardening resin that is crystalline, and surface gloss, molding strains, and directional properties of the molded objects. In view of these, it is necessary, in principle, to cool the gate region thoroughly during the molding operation. Nevertheless, as noted above, the high temperature of the region in the vicinity of the gate inlet and the necessity of forming the spool stops near the inlet render it difficult to cool the region positively. Consequently, the molding cycle cannot be sped up to attain enhanced productivity. Nor is it possible to reduce the manufacturing cost and lower the price of the products.

SUMMARY OF THE INVENTION

The present invention is aimed at improving the gate inlet that poses a number of problems as described above and speed up the molding cycle to achieve a reduction of molding cost and consequently heighten the marketable value of the moldings.

The aim of the invention is attained by a case for holding a magnetic tape cassette comprising a lid and an inner enclosure formed of a planar bottom wall portion having a pair of spool stops projecting inwardly from the inner side thereof and edge walls formed along the periphery of the bottom portion except for a part thereof and extending perpendicularly thereto, one of the edge walls being formed with a thumb recess, said inner enclosure being made by a mold with a gate inlet so that the bottom portion has a gate mark on the outer side thereof at a point where that portion meets the edge wall formed with the thumb recess, at a right angle thereto, and underneath the recess. The planar bottom portion and peripheral edge walls are molded together in one piece. The gate mark is located at the point on an extension of a line intersecting the midpoint of a straight line that connects the two spool stops, on the outer side of the planar bottom portion, and extending at right angles to the straight line.

BRIEF DESCRIPTION OF THE DRAWINGS

FIG. 1 is an outer plan view of a magnetic tape cassette case, with the lid taken away, showing a gate mark at the root of the center of one of spool stops;

FIG. 2A-A and FIG. 2B-B show two fragmentary sections taken on the lines A—A and B—B, respectively, of FIG. 1;

FIG. 3 is a perspective view of the magnetic tape cassette case of FIG. 1, showing a warpage 6' of its longitudinal edge wall;

FIG. 4 is an outer plan view of a magnetic tape cassette case, with the lid taken away, showing a gate mark 4 located underneath a thumb recess 3 in accordance with the present invention; and FIG. 5C-C is a fragmentary sectional view taken along the line C—C of FIG. 4.

DESCRIPTION OF THE PREFERRED EMBODIMENT

The present invention will be described in detail below with reference to the accompanying drawing carrying FIGS. 4 and 5. FIG. 4 is an outer view a case for holding a magnetic tape cassette, with the lid taken away. Two spool stops 2 in a pair are formed on the inner side of a planar bottom wall portion of the case. Edge walls are shown extending along the periphery of the planar portion excepting a part of it, perpendicularly to the plane where the spool stops 2 project inwardly. Longitudinal one 6 of the edge walls has a thumb recess 3 formed on the outer side and a gate mark 4 underneath the recess, indicating that the gate inlet was located there when molding the case. The case region underneath the thumb recess 3 and the surrounding region are relatively simple in configuration and normal wall thickness is maintained. This structure contributes to the solution of the afore-described problems of the prior art.

Experiments were conducted with a cassette case having a gate mark 4 conventionally in one of the sink dents 5 formed opposite to the centers of spool stops as shown in FIGS. 1 and 2, and also with a case according to the present invention having the same mark instead underneath the thumb recess 3 as in FIGS. 4 and 5. The data obtained by the comparative tests were as follows:

|  | Gate mark location | |
|---|---|---|
|  | At root of spool stop | Underneath thumb recess |
| Molding cycle time, sec | 20.0 | 17.0 |
| Shrinkage deformation, mm | 0.4 | 0.15 |
| Edge wall warpage, mm | 0.5 | 0.2 |
| Impact strength | | |
| h = 100 cm, Failure/No. of run | 3/5 | 0/5 |
| 70 cm, Failure/No. of run | 1/5 | 0/5 |
| 50 cm, Failure/No. of run | 1/5 | 0/5 |
| 30 cm, Failure/No. of run | 0/5 | 0/5 |

In the table the shrinkage deformation of 0.15 mm and the edge wall warpage of 0.2 mm of the case according to the invention, formed with the gate mark 4 underneath the thumb recess 3, were both within permissible limits.

While a preferred embodiment has been described, it is to be understood that various modifications may be made therein without departing from the spirit of the invention.

What is claimed is:

1. A case for holding a magnetic tape cassette comprising a lid and an inner enclosure formed of molded plastic and having a thin planar bottom wall portion having a pair of spool stops projecting inwardly from the inner side thereof and integral thin edge walls formed along the periphery of the bottom wall portion except for a part thereof and extending perpendicularly thereto, one of the edge walls being formed with a thumb recess, said inner enclosure being made by a mold with a gate inlet and said bottom wall portion having a gate mark formed by said gate inlet, said gate mark being on the outer side of the bottom wall portion at a point where that bottom wall portion meets the edge wall formed with the thumb recess, at a right angle thereto, and underneath the recess.

2. A case according to claim 1 wherein said gate mark is located underneath the thumb recess on the outer side of the region where the edge wall and planar bottom portion meet at a right angle to each other and at the point on an extension of a line intersecting the midpoint of a straight line that connects the two spool stops, on the outer side of the planar bottom portion, and extending at right angles to the straight line.

* * * * *